US006418400B1

(12) United States Patent
Webber

(10) Patent No.: US 6,418,400 B1
(45) Date of Patent: Jul. 9, 2002

(54) REPRESENTATION AND PROCESSING OF EDI MAPPING TEMPLATES

(75) Inventor: David R. R. Webber, Lanham, MD (US)

(73) Assignee: XML-Global Technologies, Inc., Seattle, WA (US)

( * ) Notice: Subject to any disclaimer, the term of this patent is extended or adjusted under 35 U.S.C. 154(b) by 0 days.

(21) Appl. No.: 09/223,270

(22) Filed: Dec. 30, 1998

Related U.S. Application Data

(60) Provisional application No. 60/070,115, filed on Dec. 31, 1997.

(51) Int. Cl.[7] .................... G06F 17/50

(52) U.S. Cl. .................... 703/22; 705/1; 707/503

(58) Field of Search .................... 703/22; 705/1, 705/2, 27, 26; 707/4, 503; 709/246; 713/200, 201

(56) References Cited

U.S. PATENT DOCUMENTS 5,715,397 A * 2/1998 Ogawa et al. .............. 709/246
5,892,900 A * 4/1999 Ginter et al. .............. 713/200
5,909,570 A * 6/1999 Webber .............. 703/13

OTHER PUBLICATIONS

Banta, A. Using Computer Spreadsheets in Engineering and Education, Frontiers in Education Conference, 1988, pp. 238–243.*

Le Vie Jr., D.S. Restructuring Information for Managing and Transferring Knowledge, Professional Communication Conference, 1998, IPCC 98, pp. 321–328.*

* cited by examiner

*Primary Examiner*—Russell W. Frejd
(74) *Attorney, Agent, or Firm*—Venable; James R. Burdett; Paul F. Daebeler

(57) ABSTRACT

An improved "code-free" method of describing EDI business information manipulation processes. Whereas currently EDI translation and message processing is characterized by complex programming methods, this use of a spreadsheet style metaphor enables EDI processing to be developed that can be used in an ad hoc and dynamic fashion. This matches the business requirements brought about by environments such as the Internet and Electronic Commerce. Also the method can be integrated directly into modern software tools such as Web Browser software, and used by people who are not intimately familiar with the exact details of EDI message syntax. Instead they utilize a familiar data representation in order to accomplish a complex task that otherwise would instead require highly skilled programming knowledge to perform.

38 Claims, 16 Drawing Sheets

```
Example Mapping Template and Components

%  Incoming EDI 856 processing:
%
%  Field assignment decode rules:
%             &n         - parameter number passed to process.
%             &&xxxx     - parameter returned by called function.
%             M1001      - value from EDI segment element
%             'xxx'      - Constant value
%             @function name()    - invoke special macro process -call function with parameters and return value
%              Special handling for HL loops  - X. prefix, where X. denotes the identifying letter for that HL loop
%               as specified by the HL_KEYS statement.
%               Loop occurence designator - name:2 denotes the second occurence of this value.

  TABLE    :  MANIFEST HISTORY, SQL_MNFST_HIS, ORACLE, SQL_HIST_INDX
  INDEX    :  UNIQUE, mnfst_no
  EDI_KEY  :  BSN02
  HL_KEYS  :  HL03 = 'S', HL03 = 'V'

  FIELDS   :  mnfst_no          □,   BSN02
              generator_id□     □,   @IF(S.N101 = 'SF') S.N104
              Transport1_id     □,   @IF(S.N101 = 'OC') S.N104
              Transport2_id     □,   @IF(S.N101 = 'OC') S.N104
              TSDF_id□          □,   @IF(S.N101 = 'MA') S.N104
              reference_mnfst   □ ,
              date_gen_ship     □,   @IF(V.LIN03 = '16') V.DTM02, @MAP(YYMMDD  MMDDYY)
              Trans1_SWA_Dcal   □,   @IF(S.REF01 = '47') S.REF02
              Reject_flag       □□,   &&edi_valid_flag
              Reject_reason     □,
              Batch_number      □,   @NEXTVAL1
              tscn              □□,   ST02
              ts_id             □□,   &1
              ts_date           □□,   @DYYMMDD
              ts_time           □□,   @THHMMSS
              edi_valid_flag    □,   'Y' or 'W' or 'E'
```

Comments

Table Identifier and Index details

Field Assignments and Operations

FIG. 1A

```
TABLE    :  MANIFEST SUMMARY , SQL_MNFST_SUMM, ORACLE, SQL_SUMM_INDX
INDEX    :  UNIQUE, mnfst_no
FIELDS   :  mnfst_no           □,   BSN02
            line_no           □□,    I.LIN01
            waste_code         □,   @IF(I.PID01 = 'S' & I.PID03 = 'EP') I.PID04
            quantity          □□,    I.TD107
            qnty_units       □□,    I.TD108, @XLATE1
            handling_code      □,   I.TD403

% Lookup Rules: (can be another table, or ASCII flat file list)
%
%           Table               DB type      Lookup Field(s)    Use Index
%           -----------------------------------------------------------

 @LOOKUP1   : OMS_CARRIER       , ORACLE,       CARR_CODE,        CARIERX
 @LOOKUP2   : c:\system\tables\codes.dat
 @XLATE1    : c:\pdc\edi856a.xlt

 @NEXTVAL1  : OMS_NEXT_KEY      , NATIVE,       NEXT_KEY,         NXTKEYX
```

Multiple table definitions in one template

Comments

Lookup table definitions

FIG. 1B

Field definition table components

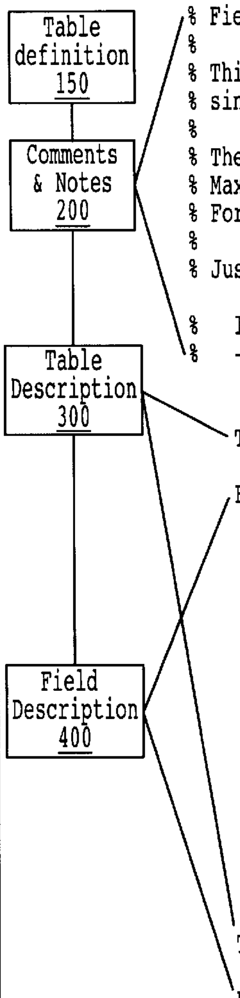

```
% Field descriptions for EDI 856 Flatfile processing
%
% This table is only normally required for Flatfiles and Btrieve,
% since for other tables the field definitions are dynamically read in.
%
% The following rules apply to the field entries.
% Max Field Size is required,
% Format                 , default is AN - Alphanumeric, other values
%                          are NM - Numeric, and NZ - Numeric zero fill.
% Justify                , default is L - Left for AN, Right for Numeric.

%  Item      Field Name        ,  Max Field Size    , Format  ,  Justify
%  --------  ------------------------------------------------------------


   TABLE   :  Manifest History, SQL_MNFST_HIS

   FIELDS  :  mnfst_no          ,  10
              generator_ID      ,  12
              Transport1_ID     ,  12
              Transport2_ID     ,  12
              TSDF_ID           ,  12
              reference_mnfst   ,  10
              date_gen_ship     ,  6
              Trans1_SWA_Dcal   ,  6
              Trans1_ship_dte   ,  6
              Trans2_SWA_Dcal   ,  6
              Trans2_ship_dte   ,  6
              TSD_recv_date     ,  6
              Reject_flag       ,  1
              Reject_reason     ,  30
              Batch_number      ,  8                 , NZ

   TABLE   :  Manifest Summary , SQL_MNFST_SUMM

   FIELDS  :  mnfst_no          ,  10
              line_no           ,  1
              waste_code        ,  4
              quantity          ,  5                 , NZ
              qnty_units        ,  1
              handling_code     ,  3
%  ---------------------------------------------------------------------
```

FIG. 2

Browse - Field Definitions Pop

Table Name: Manifest History    SQL_MNFST_HIS

| Field Name | Max Field Size | Format | Justify |
|---|---|---|---|
| mnfst_no | 10 | Alpha | Left |
| generator_ID | 12 | Alpha | Left |
| Transport1_ID | 12 | Alpha | Left |
| Transport2_ID | 12 | Alpha | Left |
| TSDF_ID | 10 | Alpha | Left |
| reference_mnfst | 6 | Alpha | Left |
| date_gen_ship | 6 | Alpha | Left |
| Trans1_SWA_Dcal | 6 | Alpha | Left |
| Trans1_ship_dte | | | |
| Trans2_SWA_Dcal | | | |

Quit   Drag / Drop   Select

| Segment ID | Reference Tag | Description | DTD Format | Linked Process |
|---|---|---|---|---|
| R403 | ss_seq_no | Ship Schedule Sequence | Numeric | |
| V101 | Voy_No | Voyage Number | Char | |
| V104 | Vsl_ID | Vessel or Lloyds # | Char | @CALL1 |
| V105 | Carr_code | Carrier Code | Char | |
| V901 | port_arv_date | Port Arrival Date | Date | |

```
<X-CHANGE>
<COMMENT>
   <Title>856 C4/0 - U.S. EPA Hazardous Waste Manifest</Title>
   <Purpose>Incoming 856 processing</Purpose>
   <Copyright>Gnosis Inc, Maryland, USA, 1998.  All rights reserved.</Copyright>
   <Liability>This material is placed in the public domain as is.</Liability>
</COMMENT>

<MAPPING>
   <TARGET EDI="X12" TRANS="856" Version="4010"/>
   <REVISION Make="1.0" Date="1998/11/29" Time="00:12:59"/>
   <OWNER>http://www.sample.com/owners/X12-856.xml</OWNER>
   <FORMATS>http://www.sample.com/owners/X12-856.dtd</FORMATS>

<DEFINE>

<TABLE>
   <NAME>Manifest History</NAME>
   <PHYSICAL_NAME>HWM_MNFST_HIS</PHYSICAL_NAME>
   <ENCODING Syntax="ORACLE" Version="7.1"/>
   <ACCESS Mode="Update"/>
   <INDEX Name="MNFST_NO" Type="UNIQUE" Sort="ASCEND">
      <INDEX_FIELDS>
         <FIELD Name="mnfst_no" EDI_SEG="BSN" EDI_FIELD="02"/>
      </INDEX FIELDS>
   </INDEX>

   <EDI_KEYS>
      <EDI_KEY_ITEM EDI_SEG="HL" EDI_FIELD="03" VALUE="S"/>
      <EDI_KEY_ITEM EDI_SEG="HL" EDI_FIELD="03" VALUE="V"/>
   </EDI_KEYS>
```

FIG. 6A

```
<PARSING>
  <MAP_RULE item="mnfst_no" map="[BSN,02"/>
  <MAP_RULE item="generator_EPA" map="@IF([S.N1,01] <> 'SF') [S.N1,04]"/>
  <MAP_RULE item="Transport1_EPA" map="@IF([S.N1,01] <> 'OC') [S.N1,04]"/>
  <MAP_RULE item="Transport2_EPA" map="@IF([S.N1,01] <> 'OC') [S.N1,04]"/>
  <MAP_RULE item="TSDF_EPA" map="@IF([S.N1,01] <> 'MA') [S.N1,04]"/>
  <MAP_RULE item="reference_mnfst" map=""/>
  <MAP_RULE item="date_gen_ship" map="@IF([V.LIN,03] <> '16') [V.DTM,02], @MAP(YYMMDD | MMDDYY)"/>
  <MAP_RULE item="Trans1_SWA_Dcal" map="@IF([S.REF,01 <> '47') [S.REF02]"/>
  <MAP_RULE item="Trans1_ship_dte" map="@IF([V.LIN,03] <> '17') [V.DTM,02], @MAP(YYMMDD | MMDDYY)"/>
  <MAP_RULE item="Trans2_SWA_Dcal" map="@IF([S.REF,01 <> 'TR') [S.REF02]"/>
  <MAP_RULE item="Trans2_ship_dte" map="@IF([V.LIN,03] <> '18') [V.DTM,02], @MAP(YYMMDD | MMDDYY)"/>
  <MAP_RULE item="TSD_recv_date" map="@IF([V.LIN,03] <> '20') [V.DTM,02], @MAP(YYMMDD | MMDDYY)"/>

  <MAP_RULE item="Reject_flag" map="N"/>
  <MAP_RULE item="Reject_flag" map="[V.PID08]"/>
  <MAP_RULE item="Reject_reason" map=" "/>
  <MAP_RULE item="Reject_reason" map="[V.PID05]"/>
  <MAP_RULE item="Batch_number" map="@NEXTVAL1"/>
  <MAP_RULE item="tscn" map="[ST,02]"/>
  <MAP_RULE item="ts_id" map="&1"/>
  <MAP_RULE item="ts_date" map="@DYYMMDD"/>
  <MAP_RULE item="ts_time" map="@THHMMSS"/>
  <MAP_RULE item="edi_valid_flag" map="@ERROR_STAT('X12')"/>
 </PARSING>
</TABLE>

<DEFINE>
```

FIG. 6B

```
<LOOKUP_RULES>

  <TABLE Type="External">
    <NAME>Carrier Lookup Table</NAME>
    <PHYSICAL_NAME>OMS_CARRIER</PHYSICAL_NAME>
    <ENCODING Syntax="ORACLE" Version="7.1"/>
    <ACCESS Mode="Write"/>
    <INDEX Name="Carr_Code" Type="UNIQUE" Sort="ASCEND">
      <INDEX_FIELDS>
        <LOOKUP_FIELD Name="Carrier_code" Format="X12:SeqnNumb"/>
      </INDEX_FIELDS>
    </INDEX>
  </TABLE>

  <TABLE Type="External">
    <NAME>Next Key Assignment Table</NAME>
    <PHYSICAL_NAME>OMS_NEXT_KEY</PHYSICAL_NAME>
    <ENCODING Syntax="NATIVE" Version="7.1"/>
    <ACCESS Mode="Write"/>
    <INDEX Name="NXTKEYX" Type="UNIQUE" Sort="ASCEND">
      <INDEX_FIELDS>
        <UPD_FIELD Name="NEXT_KEY" Format="X12:SeqnNumb"/>
      </INDEX_FIELDS>
    </INDEX>
  </TABLE>

  <FUNCTION Name="NEXTVAL1" ParmsIn="" ParmsOut="&1"
          Language="Java"
          Ref="http://ourserver/java/nextal"/>
```

FIG. 6C

```
<LOOKUP_RULES>

  <COMMENT>
    <Syntax>Field assignment decode rules:
      <Rule coding="&n" function="parameter number passed to process" />
      <Rule coding="&&xxxx" function="parameter returned by called function." />
      <Rule coding="xxxx" function="Constant value" />
      <Rule coding="@LOOKUPn'" function="cross-reference rule" />
      <Rule coding="@XLATE(ref)" function="translate value using internal XML table" />
      <Rule coding="M1001" function="value from EDI segment element" />
      <Rule coding="@NEXTVALn" function="use next value from key master file" />
      <Rule coding="@TOTAL()" function="total values from this EDI segment element." />
      <Rule coding="@COUNT()" function="Count starting at one for first occurrence, etc." />
      <Rule coding="@nnnn()" function="call function with parameters and return value" />
      <Rule coding="X + Y" function="concatenate values together, works for
                    EDI segment element, constants, &, && parms, or
                    table field name." />
      <Rule coding="@DYYMMDD" function="substitutes year, month, day, flexible, you can
                    mix order, and add / or - as required, ie MM/DD/YY" />
      <Rule coding="@THHMMSS" function="substitutes hours, mins, secs, and flexible as
                    for @D date processor." />
      </Syntax>
    </COMMENT>

    </MAPPING>

    </X-CHANGE>
```

FIG. 6D

STEP A - AN APPLICATION MENU IS DISPLAYED ON THE END USERS PC 5 VIA THE WEB BROWSER SOFTWARE 6.

STEP B - THE WEB BROWSER SOFTWARE 6 REQUESTS A LIST OF AVAILABLE DATABASES FROM THE LOCAL DATABASE CONNECTIVITY SOFTWARE 10.

STEP C - A LIST OF THE AVAILABLE DATABASES IS DISPLAYED BY THE WEB BROWSER SOFTWARE 6. IF NO DATABASES ARE DETECTED THE PROCESSING PROCEEDS TO THE NEXT STEP AUTOMATICALLY.

STEP D - THE USER IS PROMPTED TO DESCRIBE THE PROCESS THEY WISH TO ENABLE. TO DO THIS THEY SELECT FROM FOUR CATEGORIES: A PROCESS DOMAIN, A TRANSACTION TYPE, AN ACTION DETERMINER, AND AN ASSOCIATED RESPONSE.

STEP E - THE SOFTWARE COMPRISING THE INVENTION COMMUNICATES WITH THE CENTRAL GLOBAL EDI DICTIONARY 1, USING THE CONNECTIVITY CONFIGURED 3. IT USES THE CRITERIA ENTERED BY THE END USER, AND ALSO THE DATA ELEMENTS FROM ANY AVAILABLE DATABASES THAT THE USER MAY HAVE IDENTIFIED TO SEARCH FOR RELATED EXISTING TEMPLATES.

STEP F - THE WEB BROWSER SOFTWARE 6 RETURNS TO THE END USER WITH THE RESULTS FROM STEP E. FROM THIS IT IS ABLE TO PRESENT TO THE USER THE OPTION TO CHOOSE AN EXISTING TEMPLATE THAT MAY ALREADY SATISFY THEIR REQUIREMENTS.

AT STEP G, THE USER IS DIRECTED TO SELECT EXPLICIT DATABASE FIELD ELEMENTS.

AT STEP H, THE SOFTWARE COMPRISING THE INVENTION PRESENTS TO THE USER AN INITIAL TEMPLATE FORMAT COMPRISING THE TABLES 11 AND FIELDS 14.

STEP I - THE USER IS REQUESTED TO INDICATE ANY FIELDS THAT MUST CONTAIN ONLY CERTAIN DISCRETE VALUES 13.

STEP J - THE SOFTWARE THAT COMPROMISES THE INVENTION USES CROSS-CHECKS AND VALIDATIONS TO ENSURE THAT THE TEMPLATE LOGIC IS CORRECT.

STEP K - THE USER REVIEWS THE PREPARED MAPPING TEMPLATE SYNTAX PRIOR TO CONTINUING.

FIG. 9A

REPRESENTATION AND PROCESSING OF EDI MAPPING TEMPLATES

CROSS-REFERENCE TO RELATED APPLICATIONS

This provisional application is related to provisional application U.S. Ser. No. 60/070,115 filed Dec. 31, 1997 and U.S. Ser. No. 08/868,837 (now U.S. Pat. No. 5,909,570), filed Jun. 9, 1997, which is commonly owned and incorporated herein by reference. U.S. Ser. No. 08/868,837 (now U.S. Pat. No. 5,909,570) is a continuation in-part of U.S. Ser. No. 08/174,872 filed Dec. 28, 1993 now abandoned and U.S. Ser. No. 08/343,877 filed Nov. 30, 1994 now abandoned.

BACKGROUND OF THE INVENTION

The present invention relates to the field of electronic data interchange (EDI), and more particularly to a template mapping system for dynamic and flexible EDI message interchange.

Whereas currently electronic data interchange is controlled by fixed message structures, future EDI, particularly via the World Wide Web (Web) and the Internet will consist of flexible EDI messages and formats. To accommodate this technology shift, EDI users must have a means to simply and accurately convey translation information to their trading partners so that they may effectively utilize the information they are exchanging.

Whereas a template mapping for dynamic and flexible dataset translation provides this underlying mechanism, for the end user this is a complex and potentially confusing technique.

Therefore, a method is needed that is both 'code-free' (does not require the use of complex programming languages and constructs) and within the domain of commonly used existing metaphors and tools.

This should enable the user to work within a familiar working environment and use this to learn new and powerful additional new capabilities.

Furthermore, today's Internet and Web environment means that the user has to handle extended complex situations that hitherto they have not dealt with in terms of sending and receiving business information.

These, typically, consist of preparing a template to accompany the business information they need to send to a trading partner. During this process they must examine their own business application databases and sources of information, and select the required elements and associated rules. Then they reference a Global Element Dictionary located either external via an Internet URL (Uniform Resource Locator) address, or locally on a CD-ROM reference dictionary. This allows them to determine any established standards for the information they need to exchange.

After incorporating this information, they further have to assemble the actual information indicated by the template they have created. This includes accessing the database records, and then taking each element and embedding it in the correct place within the EDI message format. Since future EDI messages will be based in part on dynamic formats such as the XML syntax, (Extensible Markup Language, a derivative of the ISO SGML Standard Generalized Markup Language), this requires the use of a rule-based mechanism to correctly generate valid messages.

Once the message has been correctly completed, the user can then directly send it to the external delivery system, for receipt by a third party. (The external delivery system in this case is either the Internet or similar electronic networked delivery system).

At the end of the process, they must finally update the corresponding records within their local database system with an indicator to show the information status as "Sent" and store the recipients' address along with a reference to the transaction that was sent.

Currently, to achieve all of these actions users must rely on custom software created specifically for the purpose. Such existing software is designed for use with today's rigid and inflexible EDI message formats and standards. It, therefore, lacks the abilities described by this invention to provide truly dynamic business information exchanges that can be freely modified and manipulated.

In such a dynamic system, it is required that the user be able to successfully handle a broad range of processing situations by use of the available software tool.

SUMMARY OF THE INVENTION

Accordingly, it is the object of this invention to provide a simple and intuitive method for the end user to collect, process, create, direct and control the business information involved. This includes both sending and receiving messages.

It is the object of this invention to ensure that the end user is able to describe the processing they require in a simple and clear fashion.

It is another object of this invention to create a 'code-free' (does not require the use of complex programming languages and constructs) means of defining the processing to be accomplished.

It is a further object that this invention then automatically interfaces directly with emerging Web and Internet components and format definitions such as XML, and where required, the use of standard tools such as Sunsoft's Java applets, Netscape's JavaScript, and Microsoft's VBScript, ActiveX and other such programmable components.

This frees the user to concentrate on the business problem to be solved, instead of needing highly specialized programming knowledge to resolve it.

It is a further objective of this invention to accomplish this within the familiar existing domain of computer spreadsheet-style user interfaces.

It is a still further objective to permit the use of intelligent expert "agent" components within the spreadsheet-style template interface to both guide and direct the user, and also directly translate and interpret the EDI messages themselves.

The system is designed specifically to implement the rule based template mapping system needed to enable dynamic EDI interchanges to succeed within the context of wide scale and distributed use. Such use of distributed Electronic Commerce across a broad spectrum of the business world is unprecedented. Current traditional fixed structure EDI messages account for ten percent or less of worldwide business transactions. Dynamic flexible EDI messaging can facilitate a far greater amount of electronic commerce, particularly since the advent of the Internet as a major delivery system for such interactions.

Since a great deal of future electronic commerce will be directed through the medium of Web Browser desktop software the current invention is designed to integrate directly into this environment and enable the user to control spreadsheet-style template design directly from within the Web Browser software itself.

BRIEF DESCRIPTION OF THE DRAWINGS

FIG. 1 shows a sample rule based mapping template structure that is used to specify the actions, processing and information required. (This figure is taken from the original Mapping Template System application, where a full description of both function and purpose is already provided).

FIG. 2 shows a sample field definition table that can be derived directly from the structure of a local database repository. (This figure is taken from the original Mapping Template System application, where a full description of both function and purpose is already provided).

FIG. 6A and 6B show the use of XML syntax to present as metadata the information shown in FIG. 1.

FIG. 9A is a summary of step diagram items.

DETAILED DESCRIPTION OF THE PREFERRED EMBODIMENT

The system described here provides a flexible and concise way of creating rule based templates for use in dynamic and flexible EDI interchanges where the users are defining the format of the EDI messages to suit their own local needs.

Whereas previously EDI users had to resort to using either predefined and cumbersome X12 or UN/EDIFACT EDI message formats that had to be strictly adhered to, the current invention allows the end user complete flexibility in designing the optimal transfer mechanism and formats for the information they wish to exchange with trading partners.

It achieves this by allowing the user to view their databases and interactions through the simple mechanism of a control template. The template, while being extremely simple for the end user to manipulate, is not simple in the sophistication of its components. Furthermore, the sparseness of its syntax is a direct result of the fact that the underlining data manipulation software is using the methodology of the related application that removes the need for traditional voluminous, tedious and complex business data processing logic.

Upon receiving this information, the template user who is the recipient is able to also view the data exchange via the template visual interface. This user can then reconcile the database information with their own database structures and quickly and easily locate the information according to their business needs.

The preferred embodiment described here assumes that the User Interface mapping template spreadsheet software, and its associated template translation and interpretation software "agent" components are written using the Java programming language to ensure the components are transferable via the Internet. It further assumes that the target format for the template will be the XML document format syntax, and that the templates so designed will take advantage of Java object modules to implement discrete business processing modules.

FIG. 1 Example Template and FIG. 2 Field definition table are presented here for completeness. Both are discussed in great detail in related application U.S. Ser. No. 08/868,837 (now U.S. Pat. No. 5,909,570).

Figure 3:
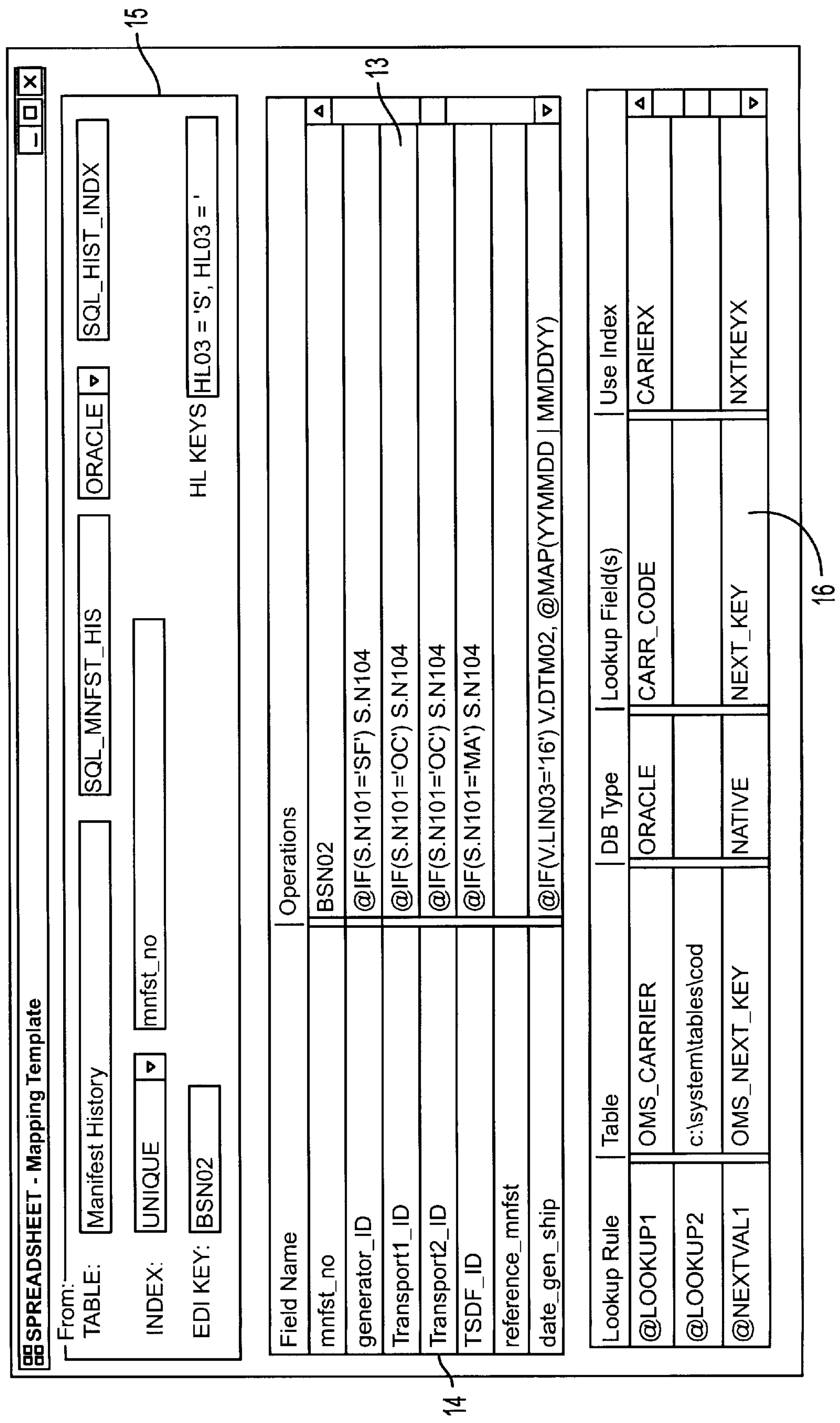
FIG. 3 shows a spreadsheet-style representation of the mapping template from FIG. 1. This shows how a template can be transitioned from a visual spreadsheet metaphor into an EDI standard format ready for distribution.

FIG. 3 shows a spreadsheet style representation of the mapping template shown in FIG. 1. FIG. 3 the user interface template format is shown. The cells and columns of the spreadsheet metaphor equate to the different types of components that make up the mapping rules templates from FIG. 1, thus making it easy to distinguish different functions and areas. However, unlike a traditional spreadsheet, where all the cells, rows and columns are uniformly laid out and are continuous, a mapping rule template uses different blocks of cells and columns arranged to indicate their function and the relation to each other. These areas are visually discontinuous and therefore the user can easily recognize the different role of each block.

This shows how a mapping template can be transitioned from a visual spreadsheet metaphor into an EDI standard format ready for distribution. The end user invokes the interface shown in FIG. 3 in order to be able to manipulate or create new mapping templates.

FIG. 3 can best be understood by considering the component parts. Each of the numbered items from FIG. 3 relate to a specific functional area. The Operations selection 13 provide the end user the ability to define spreadsheet like expressions and data manipulations. Some examples are shown using the @IF( ) operator to perform value based selections.

The Field Name selection 14 provides the end user the ability to designate fields from a data store, such as an Oracle database in the example shown, or XML tag names in an XML based data store. The Field Names specified match with physical named entities in the data store format. Names entered must match the valid format for names of that type of data store. The Table linkage section 15 then allows the user to specify the physical table structure for the data store selected.

The TABLE item allows a descriptive name, followed by a physical table object name, followed by the type of data store as a Combo box selection, followed by the physical INDEX reference name. The INDEX entry combo box selection determines whether the index values are Unique or Non-unique, followed by a listing of the actual field names that comprise the index. The EDI KEY item identifies an EDI element identifier that corresponds to the data store key, while the HL KEYS item is a special field to accommodate repeating loops within ANSI X12 formatted EDI messages.

FIG. 3 Lookup Rule area 16 provides the end user the ability to reference table based data transformations from the Operations selection area 13. As with Table selection area 15, a RULE can be linked to a specific physical table. The table may consist of a database table, a simple ASCII flat file, or an XML formatted reference file. In the sample data depicted in FIG. 3, @LOOKUP1 illustrates the user entered details for a database.

Table and DB Type reference a physical database, and Lookup Field(s) and Use Index denote the index accessing required. In the sample data depicted in FIG. 3. @LOOKUP2 illustrates a simple ASCII flat file lookup. @NEXTVAL1 designates a database table for use in assigning values sequentially. Use of such a rule in the Operations selection area 13 would automatically assign the next value to the indicated Field Name 14.

Figure 4A:
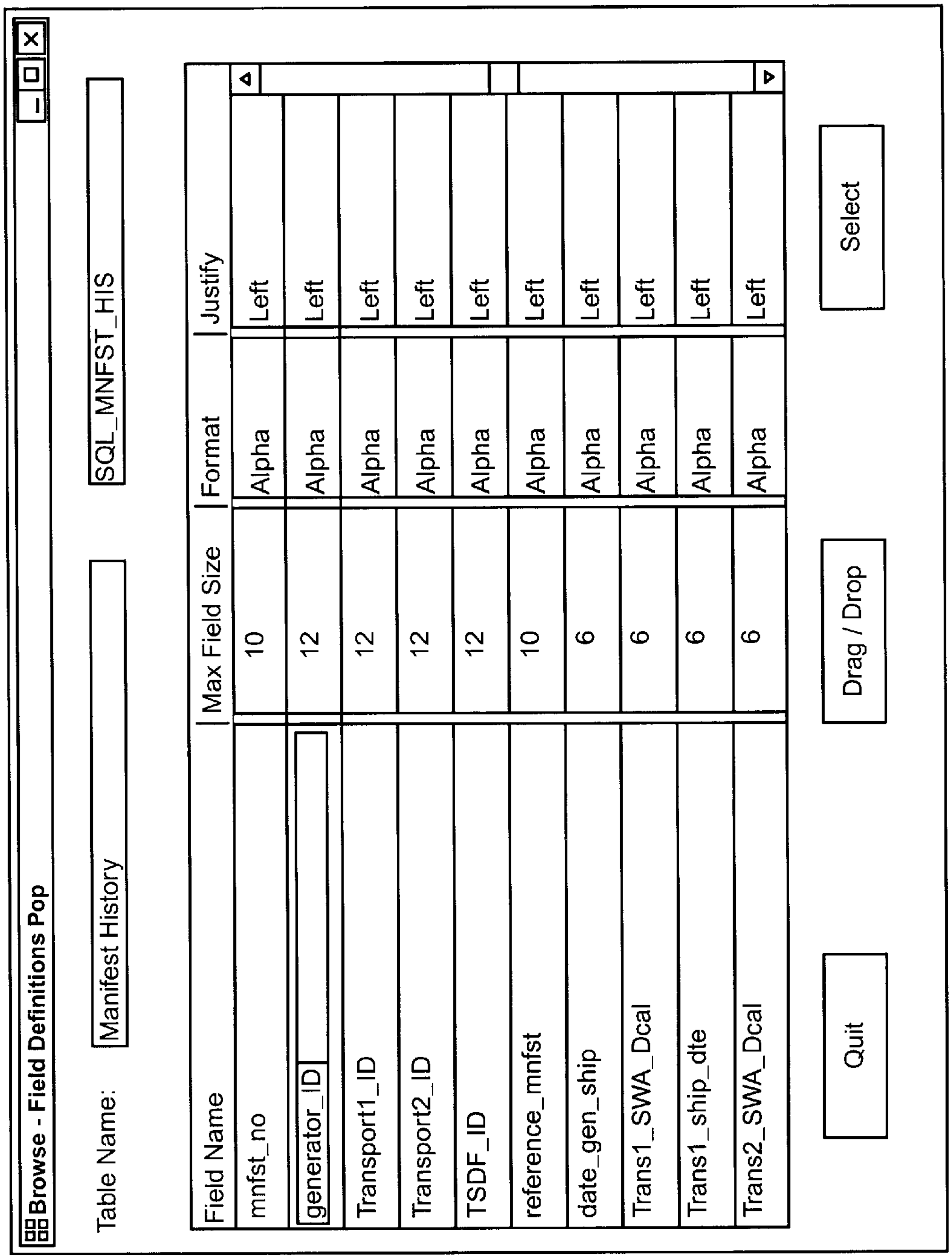
FIG. 4A shows an "pop up window" showing database table information example pop-up user dialogue to select process fields from database table information. Additional detail shown by FIG. 7, item 20.
Figure 4B:
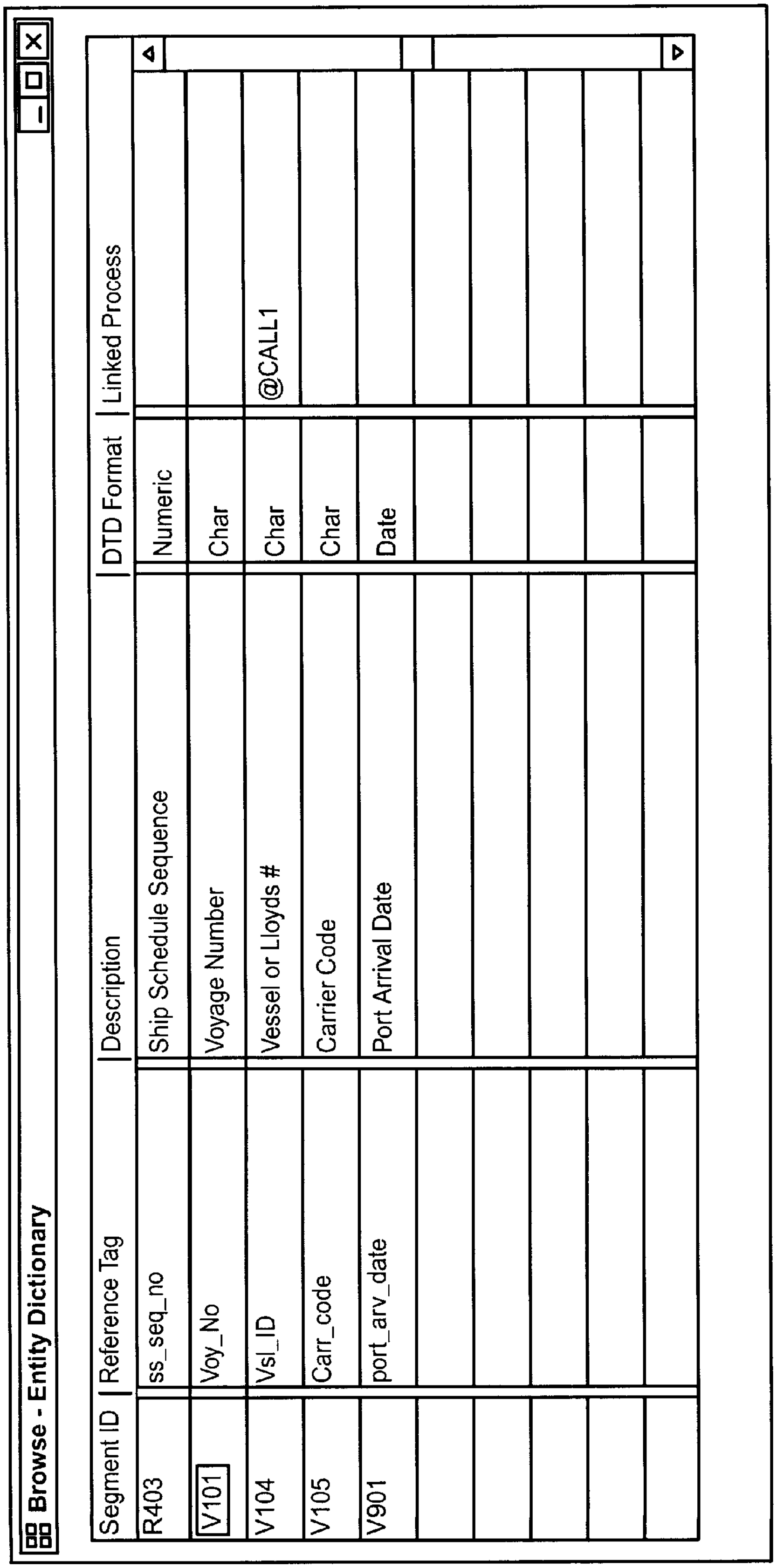
FIG. 4B depicts an example pop-up user dialogue to select received EDI fields for processing, which can be created and directed by software agents. Additional detail is shown in FIG. 7, item 21.

The end user uses the User Interface shown in FIG. 3 in conjunction with the User Interface components shown FIG. 4A and FIG. 4B that are designed to simplify the process of correctly completing entries into the spreadsheet style mapping template. The "pop up window" user interface components in FIG. 4A and FIG. 4B are invoked directly from the user interface shown in FIG. 3 as and when the end user requires to use them.

FIG. 4A shows an "pop up window" showing database table information. The end user can select appropriate field(s) by highlighting them. Control then returns to the User Interface in FIG. 3 with the selected value(s) as entries for the Field Name selection 14. Alternatively the end user can drag and drop items physically from the Field Name area on FIG. 4A. into the areas on the Field Name selection area 14 provided for this purpose. Note that the Max Field Size, Format and Justify columns on FIG. 4A handle the information referred to in the Field Descriptions 400 on FIG. 2.

FIG. 4B shows a "pop-up window" user dialogue to select appropriate EDI fields for processing. Such information can be created and directed by software agents that reference standard dictionaries of EDI fields to retrieve those specific to the end users application domain. In this example, EDI fields relating to Vessel Scheduling have been identified and shown in FIG. 4B. The end user can select either the EDI reference code or the Reference Tag name for use in expressions in FIG. 3 Operations selection area 13 or the Table selection area 15.

The FIG. 4B column labelled Segment ID shows EDI segment reference codes. These codes equate to the codes used in FIG. 3 Operations selection area 13 to identify EDI items to be processed. The next column labelled Reference Tag gives a preferred descriptive short XML tag name for the item, as used in XML formatted data or associated XML DTD (Document Type Definition). The next column labelled Description gives a textual description of the item. The next column labelled DTD Format denotes the data typing formatting information. Then the final column labelled Linked Process provides the ability to suggest to the end user a pre-built application component that can be called to process that specific segment item.

Figure 5:
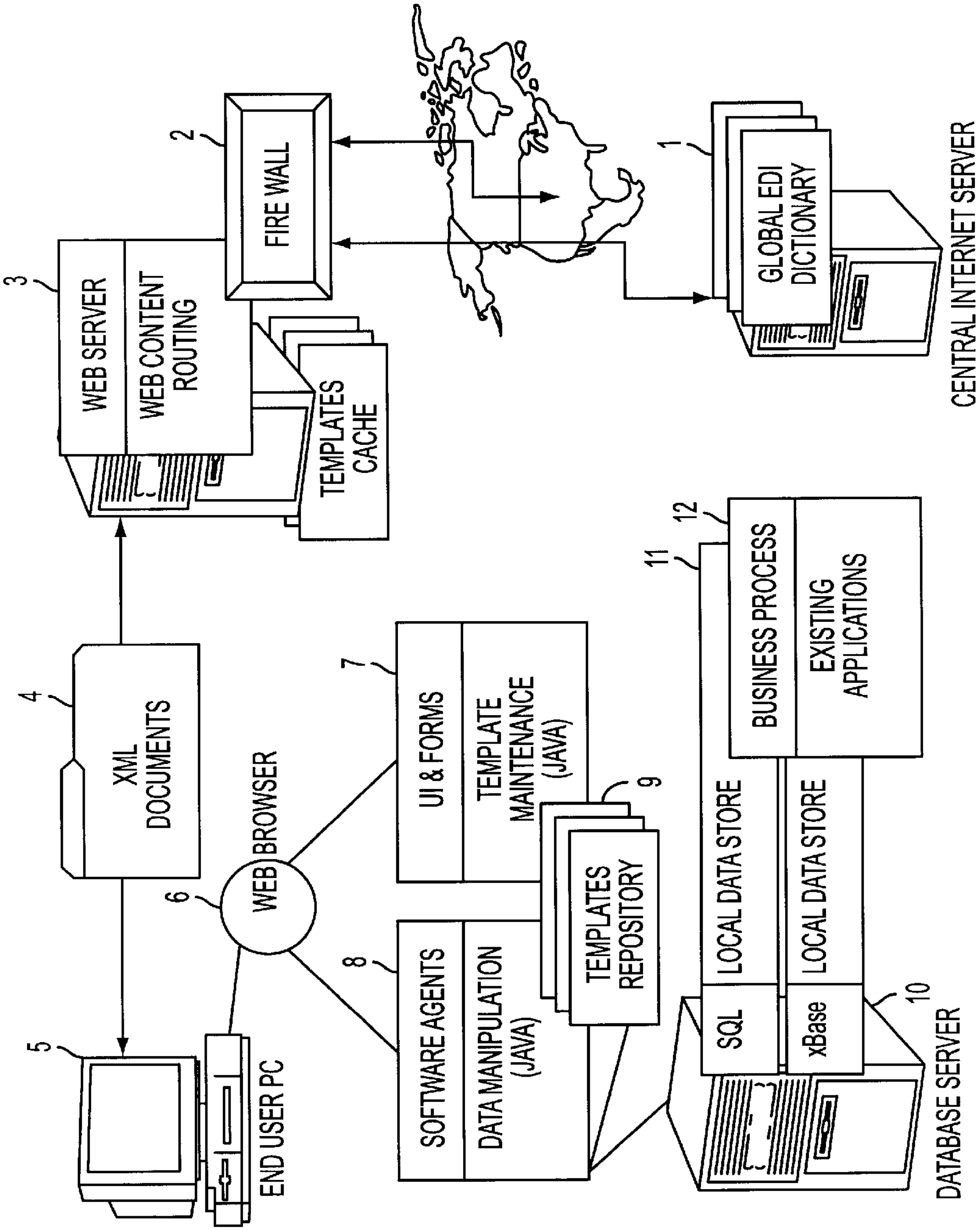
FIG. 5 shows the interaction of the spreadsheet metaphor tool with other EDI components and a typical message deliver system using typical Internet delivery components.

FIG. 5 depicts the invention deployment configuration and the core components with an Internet based implementation. FIG. 5 can best be understood by considering the component parts. The user interface components shown in FIG. 3, FIG. 4A and FIG. 4B are deployed as the UI & Forms components 7, within the Web Browser software 6 and End User PC 5 shown in FIG. 5. The end user can store spreadsheet style mapping templates to a Templates Repository 9 shown in FIG. 5, and can retrieve such mapping templates for review or later use in mapping data.

Referring to the FIG. 5, each element is now described in turn:

Global EDI Dictionary 1—This dictionary is a worldwide reference database of EDI entities that specifies standard attributes, such as ZIP Code, American Date, Social Security Number, and other formats of common information items. An Internet URL (Uniform Resource Locator) address points to a specific EDI dictionary. Multiple dictionaries are linked together to create a Global EDI dictionary. Note that the information shown in FIG. 4B is illustrative of the information that can be retrieved from a Global EDI dictionary.

Fire Wall 2—This is an Internet device to ensure that only approved trading partners can actually send information to the receiver.

Web Server 3—This is a component that delivers Web content via the Internet. It also recognizes and delivers XML content 4, Java components 7, 8 and other Web deliverable content that are http (Hyper Text Transport Protocol) compliant.

XML Documents 4—These are text documents that contain XML tokens, EDI messages, and EDI Templates.

End User PC 5—This represents the computer being used to run the actual software, and Web Browser software 6, with network communications connections to the various server computers illustrated.

Web Browser software 6—This is the term for software that runs on the end user PC 5 that is able to display content and interact with the end user.

UI & Forms 7—User Interface and Forms, this is the main interaction component for the mapping template spreadsheet style method invention. This allows the end user to visualize and manipulate the template and data.

Software Agents 8—These are needed to make the actual template process work. Without these agents the end user would not be able to send or receive EDI information correctly.

Templates Repository/Cache 9—As the end user creates outbound and also receives inbound templates, these are stored in a repository. This allows these templates to then be available as a lookup reference set, both locally, and remotely (templates cache at the Web Server provides the remote capability).

Database Server 10—This is a typical component of modern networked computer systems. The end user databases are located at a Database Server that then supplies this function to however many end user PC's 5 are connected to the network.

Local Data Store 11—On the Database Server, there are files that function as local data stores, containing database information that can only be referenced locally.

Business Process 12—The end user has one or more business applications that access the database server. These also accept incoming data passed from the template mapping system extraction process and software agents.

The components illustrated in FIG. 5 give the user a highly visual environment in which to perform the necessary construction and manipulation of mapping templates. During this process the software guides and instructs the user by recommending suitable default behaviours and values. This process itself is guided by built-in knowledge of the EDI methods and syntax's available. Particularly by referencing the Global EDI Dictionary 1 such software agents can recommend suitable existing templates that closely match the users indicated requirements. Also by using knowledge of the structure of the associated databases 11 that the user has indicated are to be processed, the software can construct default templates that most closely match the distribution of data in those databases.

A further role of the spreadsheet like tool is to allow the user, when receiving existing EDI data and templates from remote trading partners, to actually be able to directly indicate via the mapping template spreadsheet the distribution of that information into their own local databases 11 and processes 12.

Such mapping templates in the invention are exchanged in the XML format shown in FIG. 6A and FIG. 6B. The information in FIG. 6A is the same information shown in FIG. 1. The items denoted in FIG. 6A by the <TABLE> tags equate to the Table Identifier and Index details in FIG. 1. The items denoted within the <PARSING> tags as <MAP__RULE> items equate to the Field Assignments and Operations shown in FIG. 1.

Similarly, comparing FIG. 3 and FIG. 6A the following items are equivalent alternative representations:

FIG. 3 Mapping rules items 13 and FIG. 6A XML tags items <PARSING>, and <MAP__RULE> 'map' attributes.

FIG. 3 Item names 14 and FIG. 6A the XML tag items <MAP__RULE> 'item' attribute.

FIG. 3 Table details 15 and FIG. 6A the XML tag items <NAME> and <INDEX> information.

FIG. 3 Lookup rules 16 and FIG. 6A the XML tag <LOOKUP__RULES> section items.

Additional items within FIG. 6A denote processing information required to establish version control and references to pre-existing format information. The <COMMENT> tags enclose optional items that provide textual information to the end user regarding the mapping template itself. The <MAPPING> tag items <TARGET>, <REVISION>, <OWNER> and <FORMATS> establish the specific version information and references to external entities using Internet URL addressing. These are used in this case to establish an explicit ANSI X12 EDI format definitions that apply to the information interchange.

Then FIG. 6B shows the continuation of the XML format from FIG. 6A, where the XML tags <LOOKUP__RULES> <TABLE> items provide the same information as FIG. 1 Lookup table definitions. The <FUNCTION> tag items with FIG. 6B equate to the FIG. 1 Lookup table definitions @XLATE1 function definition, where the XML style in FIG. 6B reflects the information required for an Internet based deployment of a dynamic program function call. An additional <COMMENT> section is provided at the bottom in FIG. 6B that shows textual descriptions of operation rule syntax and functions to guide the end user in creating mapping templates.

Figure 7:
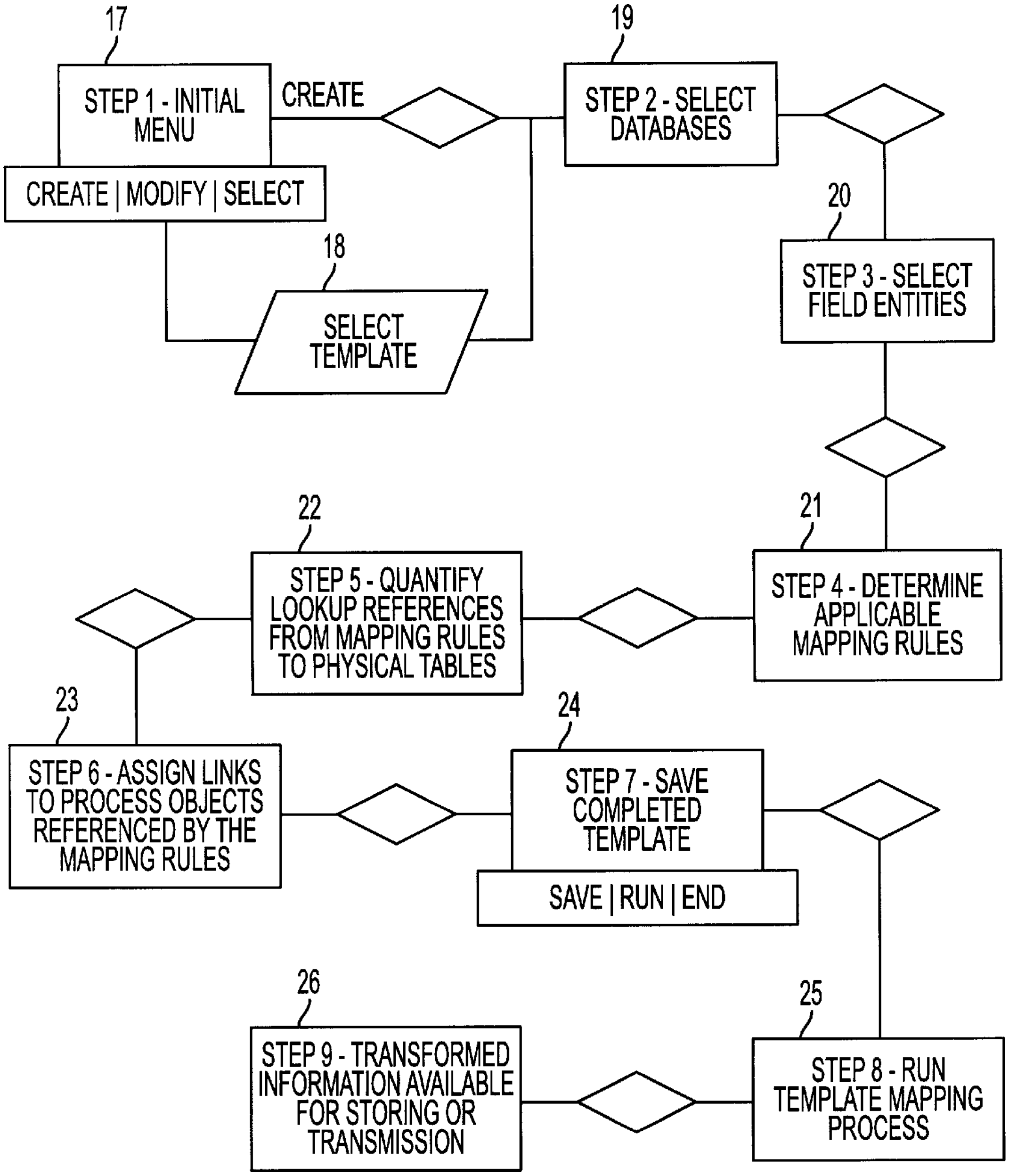
FIG. 7 depicts the extended detail of end user interaction sequence.

FIG. 7 shows the sequence of actions the end user performs in order to utilize the template mapping system.

Figure 7A:
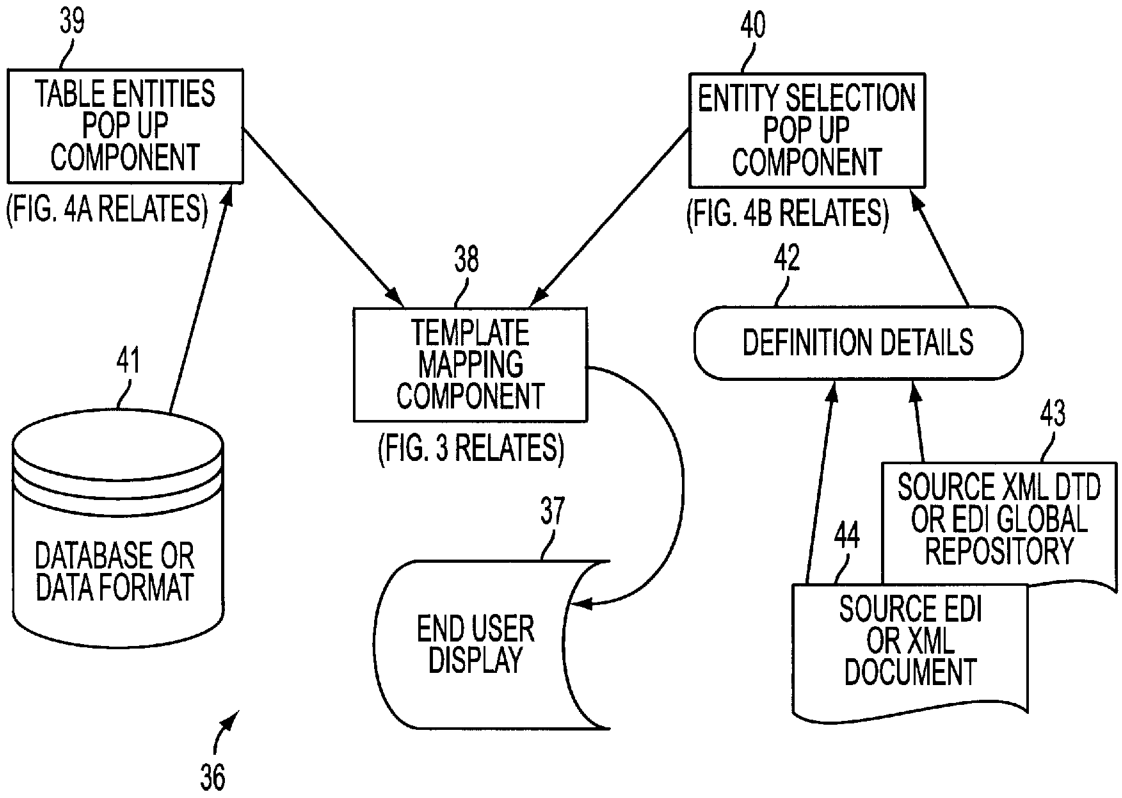
FIG. 7A shows the components linkage of end user interaction sequence.

FIG. 7A shows the components and how they interact between themselves. The various components have been labelled and will be detailed here to further understanding of the process. FIG. 7A expands on the detail provided in FIG. 5, and shows the low level interactions within the spreadsheet style mapping template method itself. The sequence of actions are now described that are performed in accordance with the invention to create a mapping template using the model shown in FIG. 5.

FIGS. 7 and 7A show additional details of the use flow of the mapping template system and how the discrete components themselves interact. Details are provided, referencing the deployment schematic of FIG. 5 and showing further interactions and processes and how those processes interact between themselves. The process flow shown is an overview of the main steps. The various components have been labelled and detailed (10,12) to further understanding of the process.

FIG. 7 item 17 initiates the interaction when the end user determines their access method to the overall mapping template definition process. They may select Create, or Modify, or Select (read only, Review) mode. FIG. 7 item 18, the end user selects a specific mapping template to reference, using a previously defined template, if applicable. FIG. 7 item 19 allows the end user to associate local databases 11 (FIG. 5) to be used in defining the mapping template 15 (FIG. 3). FIG. 7 item 20, the end user designates and selects particular field items from those databases 14 (FIG. 3). FIG. 7 item 21, then the end user assigns mapping rules 13 (FIG. 3) to the applicable fields just selected.

FIG. 7 item 22, this item applies when the user is required to create rules that reference lookup table values for validation. These lookup references tables 16 can then exist either as a set of values within the mapping template itself, or be external references to specific database system tables (as FIG. 6B shows under the <LOOKUP__RULES> section). The end user therefore enters information regarding these tables, specifically the items shown in FIG. 6B as <TABLE> items.

FIG. 7 item 23 provides a supplemental capability so that process rules themselves may consist of invoking an external software process module to return a specific set of values or perform a specific action. FIG. 6A shows mapping rules that invoke built-in functions just as @IF, and @MAP. The mapping template @CALL function is provided to allow calls to additional functions that are externally defined. These functions can then be provided as separate program executable modules as needed. FIG. 7 item 24 allows the user to store their mapping templates once complete. Optionally, this can be to a Template Repository 9 (FIG. 5). FIG. 7 item 25 provides the means to actually process the mapping template itself, take the data inputs associated with it, and then allow the end user to generate new information as shown in FIG. 7 item 26.

In addition to the base processing steps FIG. 7A shows how the various software components in the invention system equate to and interact with each other. FIG. 7A can best be understood by the detailing of each item:

36. End user interaction via software components.

37. GUI based display of template mapping system.

38. User Interface shown in FIG. 3, which allows the end user to create explicit transformation rules for each item selected using components 39 and 40.

39. Pop up display as in FIG. 4A that shows the end user the analysis of entities from the data source(s) they are interacting with. Examples include a SQL database, an XML formatted document, or an EDI formatted transaction 41.

40. Pop up display component that derives specific formatting, attribute, or processing information about the entities available. These entities 42 usually equate to those from FIG. 4A, but may also include additional entities required by external sources as part of transaction or document interchange standards. For example such standards may be defined by XML based rules held in a DTD (Document Type Definition) 43, or they may be EDI definitions retrieved via a Global Repository dictionary definition set 43. They may be derived simply by examining the received EDI structured, or XML structured document that is to be processed by the end user 44.

41. A SQL database, an XML formatted document, or an EDI formatted transaction.

42. Specific formatting, attribute, or processing information about the entities available.

43. Example such standards that may be defined by XML based rules held in a DTD (Document Type Definition), or they may be EDI definitions retrieved via a Global Repository dictionary 1 (FIG. 5) definition set.

44. Derived format details obtained simply by examining the received EDI structured or XML structured document that is to be processed by the end user.

The software components described by items 36 through 44 provide the end user with the information required to create effective mapping template sets, manage those sets and review the sets as required. The end user only requires basic GUI program control skills and knowledge of the local information that they require to manipulate in order to create these mapping templates. The familiar spreadsheet style interface facilitates this, and does not require the end user to have additional complex programming skills.

Figure 8:
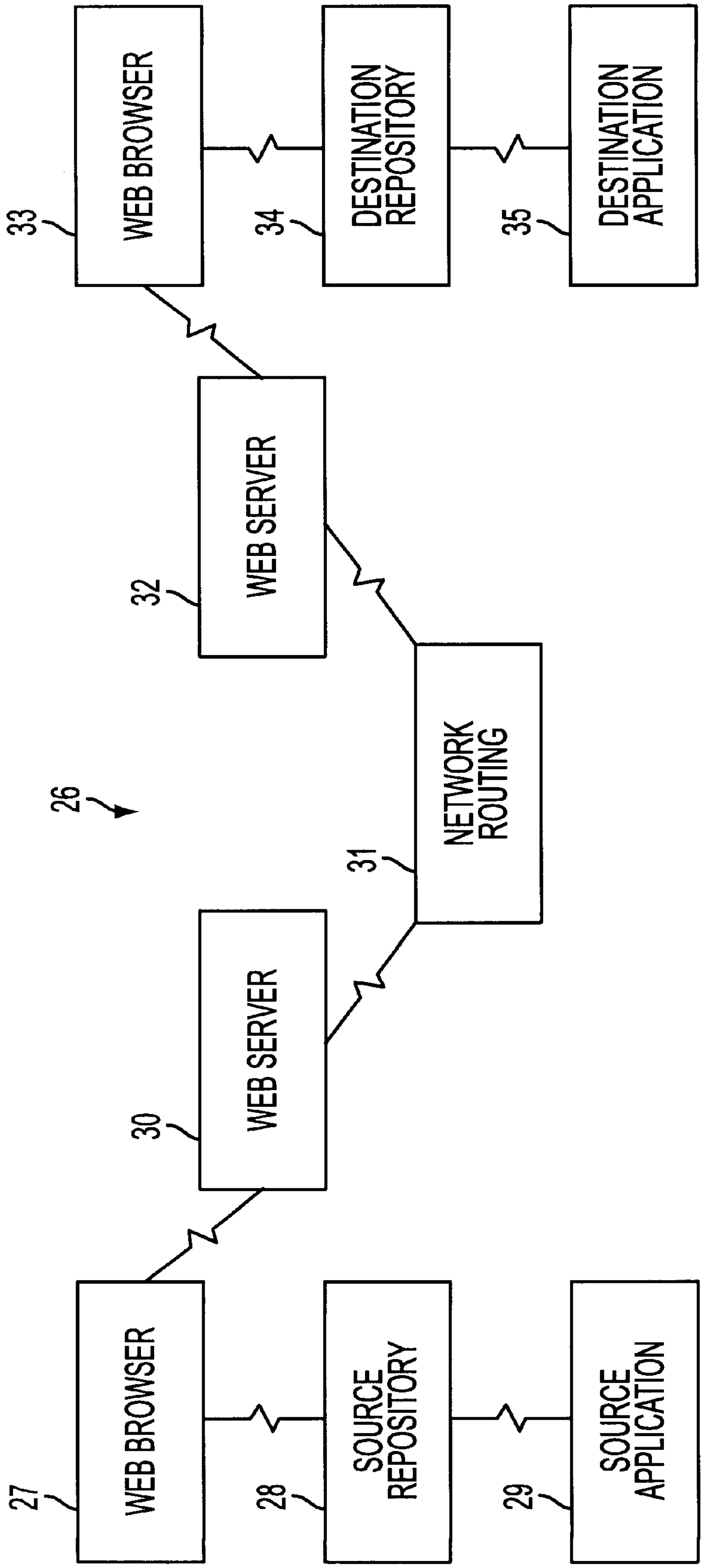
FIG. 8 illustrates the interchange model between two users' systems.

FIG. 8 illustrates how two users can interact using the invention to exchange information between their computer systems via a network connection 26. While the information flow depicted is left to right, either user (trading partner) can send or receive. FIG. 8 can best be understood by considering the component parts:

27. End user PC with Web Browser 6 based interface software.

28. Source repository of business data 1 that the end user references with the template system 7 to provide the originating information to be interchanged.

29. Originating business application software 12 (FIG. 5) that manages and generates the information to be interchanged.

30. Internet Web Server 3 (FIG. 5) components that deliver the information selected by the end user 4 (FIG. 5) via a network connection 31.

31. Network connections between end users systems.

32. Internet Web Server components 3 (FIG. 5) that receive the information selected by the end user via a network connection 31.

33. End user PC with Web Browser 6 based interface software.

34. Target repository of business data 1 that the end user references with the template system 7 (FIG. 5) to receive the information being interchanged.

35. Receiving business application software 12 (FIG. 5) that manages and uses the information that is interchanged.

By using the mapping template system described here, users can effectively exchange information, even with trading partners who they have no prior knowledge of, or using interactions that have not been previously defined between them. The mapping templates provide them with the information need to correctly manipulate the information they are exchanging. The flow shown by FIG. 8 provides them with the means to exchange the actual physical messages by utilizing whatever network transport mechanisms suit their requirements.

Figure 9:
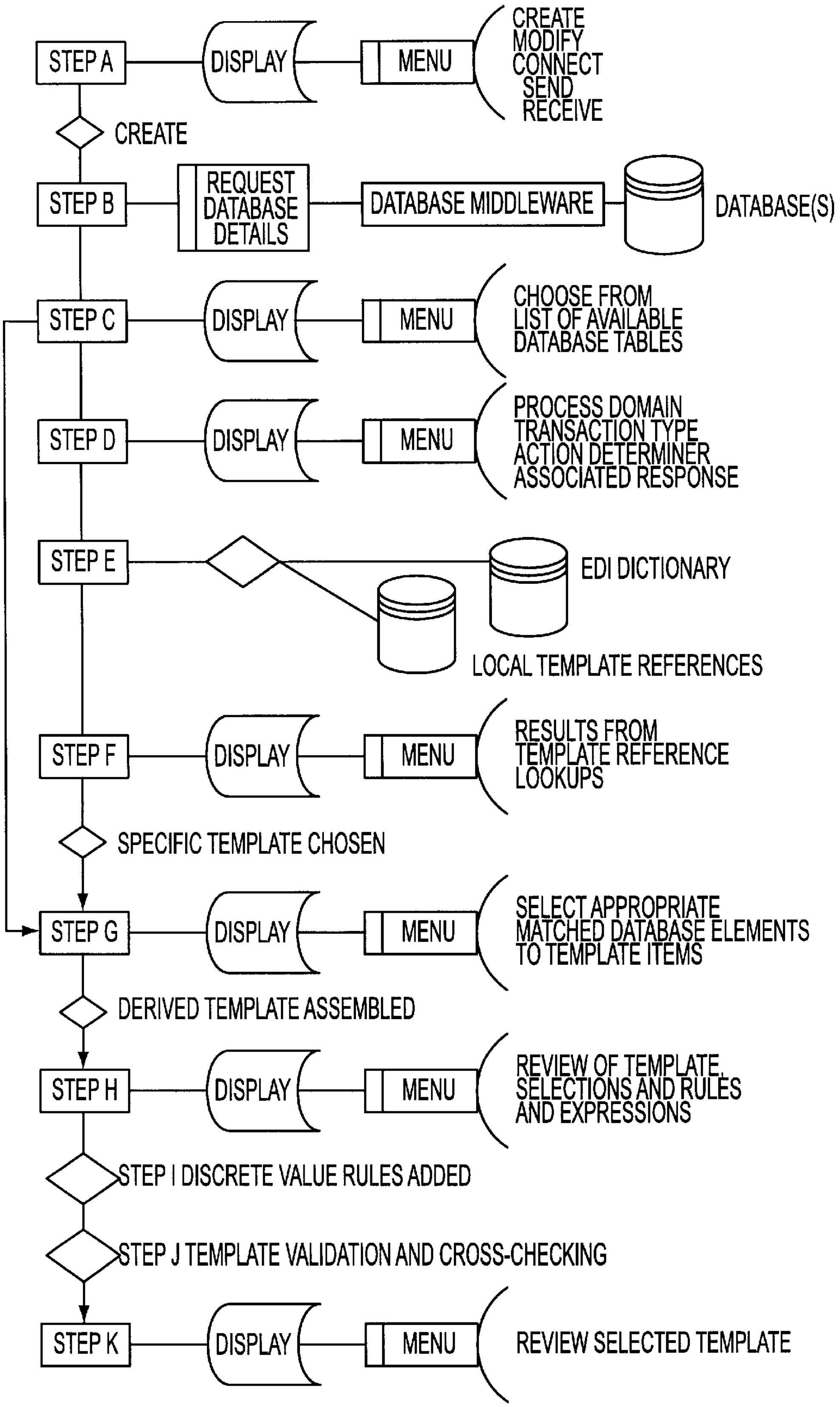
FIG. 9 is a process step diagram.

The preceding figures have now provided details of the base components and overall processes. The specific end user options in interacting with the invention are now described. With reference to the process detailed by FIG. 9, the following describes the end user actions and interactions with the invention to create valid mapping templates. The process steps are described with reference to the components depicted in FIGS. 5 and FIG. 3. At Step A an application menu is displayed on the End User PC 5 using Web Browser software 6 after the user has successfully configured and installed said Web Browser software 6 for operation on their computer 5. Included in this is establishing connectivity to their application database system 10, if such interactions are desired or required 12.

From this application menu 6 the user is given the option of creating a template in accordance with the invention (see FIG. 7 for details of process flow required). Upon selection of this option, at Step B the Web Browser software 6 requests a list of available databases 11 from the local database connectivity software components 10 (via database socket connectivity middleware such as ODBC or JDBC).

Following this at Step C a list of the available databases is displayed by the Web Browser software. If no databases are detected the processing proceeds to the next step automatically. Otherwise the user selects one or more databases from the available list displayed to them. If the user selects more than one database, they are requested to indicate a primary database from the list of databases. A primary database is the one containing the most important information for the user. Also if any database names are deemed to be cryptic in nature, any cryptic names found can be displayed to the user for clarification. An example would be a database named "RCVBL", that the user may choose to more accurately describe as "Accounts Receivable". Alternatively the user can skip such a table name without making any clarification, as they desire.

Next at Step D the user is prompted to describe the process they wish to enable 7. To do this they select from four categories: a process domain, a transaction type, an action determiner, and an associated response.

A process domain can be selected from a list [for example comprising Insurance, Healthcare, Transportation, Retail, Scientific], or specified by the end user typing in a new domain not available on the list directly.

A transaction type will similarly be selected from a list [such as Invoice, Payment, Laboratory results, Purchase order, Catalogue entry], or specified by the end user typing in a new transaction type not available on the list directly.

An action determiner will similarly be selected from a list [such as send, receive, deliver, or translation]. This describes the explicit purpose of the mapping template to be created.

An associated response is an optional category. When so indicated the user is choosing a second template that will be used in conjunction with this new template. So a user may create an Invoice template for sending, and associate a Payment template for receiving back the associated response. A list of existing templates stored locally 9 by the user will be used to allow them to select an item to specify here.

From this processing continues at Step E when the software comprising the invention communicates via Web Server 3 through Fire Wall 2 with the central Global EDI dictionary 1, using the connectivity previously illustrated. It uses the criteria entered by the end user, and also the data elements from any available databases 11 that the user may have identified to search for related existing templates.

Next at Step F the Web Browser software 6 returns to the end user with the results from Step E. From this it is able to present to the user the option to choose an existing mapping template that may already satisfy their requirements. (If the user selects an existing mapping template then the software comprising the invention skips directly to follow the preferred embodiment described under Step K that follows this section).

At Step G the user is directed to select explicit database field elements 14. Again the software comprising the invention automatically looks up the data elements from any available databases 10 indicated by the user previously in Step C (When the user selects a fields element the name of that element can be checked for accuracy using a dictionary check. Any cryptic names found can be displayed to the user for clarification. An example would be a field named "Acctng #", that the user may choose to more accurately describe as "Internal Accounting Number". Alternatively the user can exclude a field or skip such a field name without making any clarification, as they desire [FIG. 4A pop-up menu shows additional detail].

At Step H the software comprising the invention presents to the user an initial template format comprising the tables and fields, and their associated linkages [FIG. 3 and FIGS. 7A and 7B show additional details]. Existing indexes defined within the database tables to determine such linkages 15, along with the fields selected by the user themselves (See FIG. 7A for example) are used. Also in the template are any field attributes such as date type, numeric, logical, text, and field lengths, FIG. 2. The user is now requested to specify a selection criteria, such as a key value for and index field for the primary table identified in Step C. This selection criteria will be used either to retrieve existing information from the database table, or to create new information if it does not exist already.

The user selects from a list of the fields previously selected in Step G. For each field a list of common selection criteria are presented from the unique primary index key for that database. Examples include a choice from: "Today's Date", "Equal to an entered value", or "Calculation". If the user chooses Calculation then they are able to enter a formula in spreadsheet style notation 13, with the use of program functions, to describe the computation needed. FIG. 6 <PARSING> <MAP_RULE> items illustrates this technique. If they choose "Equal to an entered value", then two actions can occur. For a template being used to send information this value will either be passed programmatically as a parameter to the template, or the user will be prompted to enter the correct value. For a template receiving data, then the value associated with that incoming template at that location 14 will be used to reference the associated database record 15.

At Step I the user is requested to indicate any fields that must contain only certain discrete values. An example would be State Code, that can only contain one of 50 valid two byte state identifiers. The software can then request a list of valid entries, or reference the database to determine them (if the database supports this capability to request to find all unique values). These values are then associated with the particular field and stored into a separate section of the template for this purpose. The user may optionally skip this step.

At Step J the software that comprises the invention uses cross-checks and validations to ensure that the template logic is correct. If an error is found, processing is returned to the correct Step (A through I) to resolve the problem. If no errors are present then the user is prompted to save the template using an appropriate name that they enter. The mapping template is then saved ready for use.

At Step K we now proceed to describe the interactions that occur when at Step A above the user decides to use an existing template that they have previously received from an external source, or as a result of Step F above they select a mapping template retrieved from the Global EDI dictionary 1. Once a pre-existing mapping template is selected the user can choose to review it from within the spreadsheet style user interface. When the mapping template matches their existing environment and system configuration they can proceed directly to Step J, validation and cross-checking. However, should the user require to customize the mapping template for their own use, then the following revised flow of steps applies.

Steps B through Step D apply from above, requesting information relating to the local data stores. Next processing then proceeds as from Step G above. However, a mapping template already exists, therefore the user now creates their own original derived from that. The objective is to use the existing template as a road map to guide in the construction of the users' own mapping template. The template items now refer to items that the existing template references. As with Step G previously the user simply associates these original items in the mapping template to their own equivalent local database elements 14 and table names 11. Then the user can optionally re-use the rules and expressions from the existing template 13, or amend or add new ones as required. This equates to Steps H and I from before, then the validation and cross-checking of the revised mapping template as with Steps J and K previously explained applies.

Once the mapping templates are created the end user can either use them locally to control manipulation of their local information exchanges, or they can send them to their trading partners along with actual documents and transactions. Their trading partners can then review these mapping templates that they receive in order to better understand the information they are exchanging. Additionally they can modify and create their own local versions of these mapping templates that match their specific processing requirements using the same methods and tools.

Having now set forth a detailed example and certain modifications incorporating the concept underlying the present invention, various other modifications will obviously occur to those skilled in the art upon becoming familiar with said underlying concept. It is to be understood, therefore, that within the scope of the appended claims, the invention may be practiced otherwise than as specifically set forth herein.

What I claim is:

1. A template mapping system comprising:

a computer system operating with data structured according to a protocol;

a communications means for accessing a local dataset from said computer system in said protocol;

a means for accessing a Web Server from said computer system; and a means, using a spreadsheet-style template interface, for creating a mapping template using said computer system.

2. A system according to claim 1, wherein said means for creating said mapping template further comprises a means for replicating a trading partner's data interactions by applying said mapping template to said local dataset.

3. A system according to claim 2, wherein said means for replicating a trading partner's data interactions by applying said mapping template to said local dataset further comprises a means for retrieving said trading partner's mapping template via said Web Server.

4. A system according to claim 3, wherein said means for creating said mapping template further comprises a means for constructing a local version of said trading partner's mapping template by changing a plurality of items in said mapping template to definitions from said local dataset.

5. A system according to claim 4, wherein said means for constructing a local version of said trading partner's mapping template by changing a plurality of items in said mapping template to definitions from said local dataset further comprises, a means, using a spreadsheet-style template interface, for selecting a plurality of explicit database field elements or items from said local dataset as additions or replacements to said mapping template.

6. A system according to claim 4, wherein said means for constructing a local version of said trading partner's mapping template by changing a plurality of items in said mapping template to definitions from said local dataset further comprises, a means, using a spreadsheet-style template interface, for selecting a plurality of explicit database field elements or items of said mapping template to be deleted.

7. A system according to claim 4, wherein said means for constructing a local version of said trading partner's mapping template by changing a plurality of items in said mapping template to definitions from said local dataset further comprises, a means, using a spreadsheet-style template interface, for modifying a plurality of field attributes.

8. A system according to claim 4, wherein said means for constructing a local version of said trading partner's mapping template by changing a plurality of items in said mapping template to definitions from said local dataset further comprises, a means for verifying and validating said mapping template.

9. A system according to claim 1, wherein said means for creating said mapping template further comprises a means for replicating a mapping template posted to a Global EDI Dictionary retrieved via a Web Server by applying said mapping template to said local dataset.

10. A system according to claim 9, wherein said means for creating said mapping template further comprises a means for constructing a local version of said mapping template retrieved from said Global EDI Dictionary by changing a plurality of items in said mapping template to definitions from said local dataset.

11. A system according to claim 10, wherein said means for constructing a local version of said mapping template retrieved from said Global EDI Dictionary by changing a plurality of items in said mapping template to definitions from said local dataset further comprises, a means, using a spreadsheet-style template interface, for selecting a plurality of explicit database field elements or items from said local dataset as additions or replacements to said mapping template.

12. A system according to claim 10, wherein said means for constructing a local version of said mapping template retrieved from said Global EDI Dictionary by changing a plurality of items in said mapping template to definitions from said local dataset further comprises, a means, using a spreadsheet-style template interface, for selecting a plurality of explicit database field elements or items of said mapping template to be deleted.

13. A system according to claim 10, wherein said means for constructing a local version of said mapping template retrieved from said Global EDI Dictionary by changing a plurality of items in said mapping template to definitions from said local dataset further comprises, a means, using a spreadsheet-style template interface, for modifying a plurality of field attributes.

14. A system according to claim 10, wherein said means for constructing a local version of said mapping template retrieved from said Global EDI Dictionary by changing a plurality of items in said mapping template to definitions from said local dataset further comprises, a means for verifying and validating said mapping template.

15. The apparatus according to claim 1, wherein the means for creating said mapping template further comprises means for defining index fields to control sequences of information processing.

16. The apparatus according to claim 1, wherein the means for creating said mapping template further comprises means for referencing via look-up table a dataset for validation.

17. A method for creating a mapping template, comprising the steps of:

replicating a trading partner's data interactions by applying said mapping template to a local dataset, wherein said replicating step further comprises the step of retrieving said trading partner's data interactions via a Web Server using a spreadsheet-style template interface; and constructing a local version of said trading partner's mapping template by changing a plurality of items in said mapping template to definitions from said local dataset.

18. The method according to claim 17, wherein said constructing step further comprises the step of selecting, using the spreadsheet-style template interface, a plurality of explicit database field elements or items from said local dataset as additions or replacements to said mapping template.

19. The method according to claim 17, further comprising the step of defining index fields to control sequences of information processing.

20. The method according to claim 17, further comprising the step of referencing via look-up table a dataset for validation.

21. The method according to claim 17, further comprising the step of referencing via look-up table a data set for validation and transformation.

22. The method according to claim 17, wherein the means for creating said mapping template further comprises means for referencing via look-up table a dataset for validation and transformation.

23. The method according to claim 17, wherein said constructing step further comprises the step of selecting, using the spreadsheet-style template interface, a plurality of explicit dataset field elements or items of said mapping template to be deleted.

24. The method according to claim 17, wherein said constructing step further comprises the step of modifying, using the spreadsheet-style template interface, a plurality of field attributes.

25. The method according to claim 17, wherein said constructing step further comprises the step of verifying and validating said mapping template.

26. A method for creating a mapping template, comprising the steps of:

replicating a Global EDI Dictionary mapping template by applying said mapping template to a local dataset, wherein said replicating step further comprises the step of retrieving said Global EDI Dictionary mapping template via a Web Server using a spreadsheet-style template interface; and constructing a local version of said trading partner's mapping template by changing a plurality of items in said mapping template to definitions from said local dataset.

27. The method according to claim 26, wherein said constructing step further comprises the step of selecting, using the spreadsheet-style template interface, a plurality of explicit database field elements or items from said local dataset as additions or replacements to said mapping template.

28. The method according to claim 26, wherein said constructing step further comprises the step of selecting, using the spreadsheet-style template interface, a plurality of explicit dataset field elements or items of said mapping template to be deleted.

29. The method according to claim 26, wherein said constructing step further comprises the step of modifying, using the spreadsheet-style template interface, a plurality of field attributes.

30. The method according to claim 26, wherein said constructing step further comprises the step of verifying and validating said mapping template.

31. A method for creating transformation information, comprising:

selecting field items for a mapping template from a local dataset associated with the mapping template using a spreadsheet-style template interface;

assigning mapping rules to the selected field items;

creating mapping rules for referencing look-up tables, which reference objects within the mapping template or reference objects stored in an external dataset; and transforming referenced objects, according to the mapping template, into transformed information for transmission with the mapping template to a user for use by the user.

32. The method as in claim 31, further comprising selecting the mapping template from a set of stored mapping templates.

33. The method as in claim 32, further comprising modifying the selected mapping template for use in transforming objects.

34. The method as in claim 31, further comprising assigning links to process the objects referenced by mapping rules.

35. The method as in claim 31, further comprising storing the mapping template in a global EDI dictionary for reuse.

36. A computer readable medium having computer readable instructions stored therein for creating a mapping template, wherein said computer readable instructions comprise:

means for enabling a computer to replicate a trading partner's data interactions via a Web server using a spreadsheet-style template interface; and means for enabling the computer to construct a local version of said trading partners mapping template by changing a plurality of items in said mapping template to definitions from said local dataset.

37. A computer readable medium having computer readable instructions stored therein for creating a mapping template, wherein said computer readable instructions comprise:

means for enabling a computer to replicate processing of a mapping template retrieved from a Global EDI Dictionary by applying said mapping template to a local dataset, including retrieving said mapping template via a Web Server using a spreadsheet-style template interface; and means for enabling the computer to construct a local version of said trading partner's mapping template by changing a plurality of items in said mapping template to definitions from said local dataset.

38. A computer-readable medium containing computer-readable instructions for performing the steps comprising:

selecting field items for a mapping template from a local dataset associated with the mapping template using a spreadsheet-style template interface;

assigning mapping rules to the selected field items;

creating mapping rules for referencing look-up tables, which reference objects within the mapping template or reference objects stored in an external dataset; and transforming referenced objects, according to the mapping template, into transformed information for transmission with the mapping template to a user for use by the user.

* * * * *